Patented Nov. 5, 1929

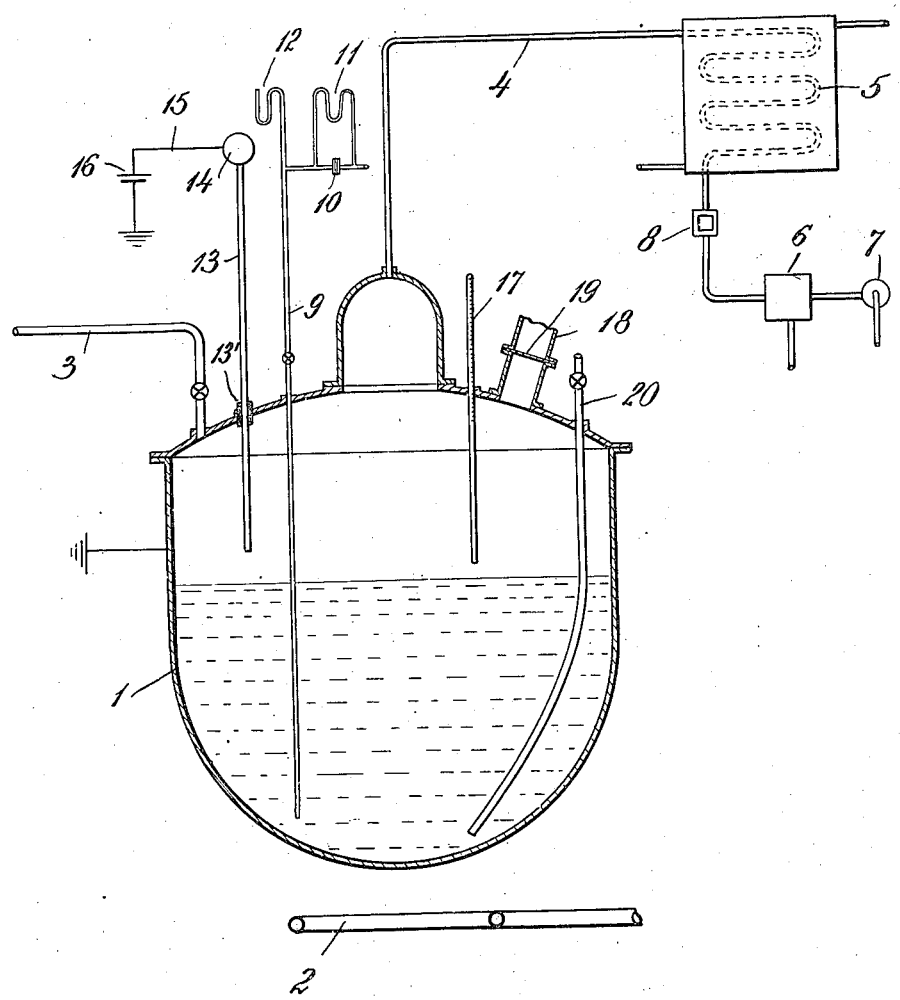

1,734,699

UNITED STATES PATENT OFFICE

JUSTIN F. WAIT, OF NEW YORK, N. Y., ASSIGNOR TO NATIONAL ANILINE & CHEMICAL CO., INC., A CORPORATION OF NEW YORK

PROCESS OF DEHYDRATING CAUSTIC

Application filed December 31, 1924. Serial No. 759,046.

This invention relates to a process and apparatus for dehydrating materials. It is especially applicable to dehydrating such materials as caustic, for example, where it is desirable to reduce the water content to as low as 10% or less.

Heretofore in dehydrating materials of this character, the materials have been placed in a closed vessel to the outside of which heat was applied for raising the temperature and a vacuum was also sometimes maintained to facilitate the operation. In such dehydration processes difficulties and troubles often arose because the material was subject to foaming and was apt to foam over if the vacuum was too high or if heat was applied too rapidly with consequent losses and interruption of the process. Because of the danger of foaming over the operation was often carried out with very much less material in the vessel than was possible so as to minimize these dangers. In such cases the volume of the material often became very small and caused local overheating and consequent destruction of the dehydrator.

When caustic materials are being dehydrated visual inspection of the interior of the dehydrator is not practicable during the process because the corrosive properties of the materials and the high temperatures often necessary preclude the use of a sight glass.

By the present invention the operation of the process is controlled in accordance with the liquid level or in accordance with the foam level or both so as to utilize the capacity of the dehydrator more fully and also so as to render the operation safe and more satisfactory. Means are used to show the liquid level and also to indicate when the foam level is becoming dangerously high, without necessitating an inspection of the inside of the dehydrator. Provision is also made for maintaining a vacuum, carrying away and condensing vapors, and means may be provided for observing the amount of vapors being condensed at any particular time.

An arrangement of apparatus suitable for carrying out the process is illustrated in the accompanying drawings in which reference character 1 indicates a closed metallic vessel or dehydrator which may be heated from any convenient source 2. The dehydrator is provided with a valved feed pipe 3 and an outlet pipe 4 which leads to a condenser 5 that is in turn connected to a separator 6 which may be connected to any convenient means 7 for producing a vacuum. A sight glass 8 may be interposed in the line between the condenser 5 and the separator 6 for enabling the condensate to be observed.

The dehydrator 1 may be provided with a valved pipe 9 reaching below a point at which it is desired to maintain the liquid level. The pipe 9 leads from a source of gas supply not shown and has an orifice and a manometer 11 for indicating the quantity of gas flow. Another manometer 12 is provided to indicate the pressure in the pipe 9. The readings of the two manometers can be calibrated to show the liquid level in the dehydrator 1 when gas is passed through the pipe 9 into the liquid. Other means may be used for indicating the liquid level without visual or physical access to the vessel 1. The dehydrator 1 also has an electrode 13 projecting through an insulated air-tight hole 13' in the cover to a distance above which the foam from the materials being dehydrated should not be permitted to rise. The electrode 13 is connected through the alarm 14 to one side 15 of a source 16 of electricity, the other side of which, as well as the dehydrator 1, being grounded. The dehydrator may also be provided with a thermometer 17 and a large pipe 18 leading to a place of safety. This pipe 18 may be provided with a safety blank 19 which will be ruptured as soon as the pressure reaches a predetermined limit. A valved discharge pipe 20 leads to the bottom of the dehydrator 1 and may be used for discharging the dehydrated contents.

The operation is as follows: The material to be dehydrated is introduced through the inlet pipe 3 into the dehydrator 1 until the desired level is reached, and heat is applied to increase the temperature to the point at which vapors pass off. By injecting gas through the pipe 9, the readings of the manometers 11 and 12 will indicate the depth of liquid in the dehydrator and if foam rises until it contacts with the lower end of the electrode 13, a circuit will be completed through the wall of the dehydrator 1, the foam, electrode 13, alarm 14, battery 16 and the ground, thus giving a warning. The operating conditions can then be regulated as, for example, by decreasing the vacuum or altering the rate of feed or reducing the rate of applying the heat. During the normal operation the sight glass 8 can be observed to show the operator whether the expected amount of condensate is being removed. The operator may regulate the rate of heat input in accordance with the amount of vapors going off.

The following is given as a specific illustration of the process in which a mixture of caustic soda and potash is dehydrated. A sufficient quantity of a solution of the two caustics is introduced into the dehydrator 1 until a level approximating at least 40% of the volume of the vessel is reached and heat is applied. Pressure is maintained below 12 pounds absolute. As evaporation takes place and the volume of the boiling mass decreases, additional liquid is fed to maintain the desired liquid level. The rate of heating is such as to avoid excessive foaming of the contents of the vessel. If excessive foaming should occur, the foam would contact with the electrode 13 causing an alarm whereupon the rate of firing or other conditions may be altered to reduce the foam level. Thereafter the weak liquid is fed in continuously, usually with noticeable rise in the boiling point of the mass, the feed being dependent somewhat upon the vacuum maintained upon the system. It is usually desirable to maintain a temperature between 200° and 300° C. while thus feeding the liquid, the higher temperature usually existing toward the end of the feed. After this approximate temperature has been reached the feed is stopped and the temperature further increased to above 400° C., caution being taken as the temperature of about 350° C. is passed to prevent foaming over, which is most apt to occur at or near this temperature. At a somewhat higher temperature the heating rate may be again increased until the final temperature is reached. This temperature in turn depends upon the vacuum maintained and the final degree of dehydration desired. It has been found that with a final temperature of about 470° C. and a vacuum corresponding to about 2 pounds absolute pressure, a dehydrated caustic containing less than 1% of moisture is produced. This is usually suitable for commercial use.

During the operation it is desirable to condense and recover the vapors since they contain an appreciable quantity of caustic, entrained or otherwise carried therewith. This is true in particular when the dehydrator is being forced to obtain a high output which is commercially desirable. Should excess of foaming occur or an appreciable amount of vapor be suddenly released to cause a positive pressure on the dehydrator, it may be reduced by means of the safety blank 18 and the foam and vapors therefrom may be diverted away from the operating space.

When the charge has been completed it is withdrawn by applying slight pressure to the dehydrator or vacuum to a receiver attached to pipe 20. For other kinds of caustic and for extending the life of the equipment with the mixture of sodium and potassium hydroxides, it is desirable to reduce the operation temperature materially below the 470° C. suggested above. This is made possible by carrying out the dehydration under an unusually high vacuum of less than 1 pound absolute pressure. Under these conditions the final temperature required for a desired degree of dehydration is materially less. In order to avoid overheating of the metallic vessel and to obtain uniform extraction of heat by the liquid, the level of liquid inside the vessel should not be permitted to vary more than about 20% from the level at which the operation has been found to be most satisfactory.

Among the advantages to be gained by this method of operation involving specific control of the liquid level within the dehydrator are increased safety of operation, increased capacity and increased life of equipment.

I claim:

1. The process of dehydrating caustic alkali containing in excess of 10% moisture which comprises introducing the caustic into a closed vessel until approximately 40% of the volume of the vessel is filled, heating the vessel while maintaining the pressure in said vessel below 12 lbs. absolute, introducing weak caustic liquor into said vessel while maintaining the temperature of the liquor in said vessel between 200° and 300° C., discontinuing the introduction of weak caustic liquor into said vessel and raising the temperature of the liquor in said vessel to above 400° C. while maintaining the pressure in said vessel at about 2 lbs. absolute.

2. The process of dehydrating caustic alkali which comprises introducing the caustic into a vessel, heating the vessel while maintaining the pressure in said vessel at a low vacuum, introducing weak caustic liquor into said vessel while maintaining the temperature of the liquor in said vessel between 200° and 300° C., discontinuing the introduction of weak caustic into said vessel and raising the temperature of the liquor in said vessel to above 400° C. while maintaining the pressure in said vessel at a high vacuum.

In testimony whereof I affix my signature.

JUSTIN F. WAIT.